(12) United States Patent
Lee et al.

(10) Patent No.: US 8,361,696 B2
(45) Date of Patent: Jan. 29, 2013

(54) POLYMER RESIN COMPOUNDS AND PHOTORESIST COMPOSITION INCLUDING NEW POLYMER RESIN COMPOUNDS

(75) Inventors: Keon-Woo Lee, Daejeon (KR); Sung-Hyun Kim, Daejeon (KR); Chang-Ho Cho, Daejeon (KR); Dong-Kung Oh, Daejeon (KR); Min-Young Lim, Sungnam-si (KR); Ji-Heum Yoo, Daejeon (KR); Sang-Kyu Kwak, Daejeon (KR)

(73) Assignee: LG Chem, Ltd., Seoul (KR)

( * ) Notice: Subject to any disclaimer, the term of this patent is extended or adjusted under 35 U.S.C. 154(b) by 350 days.

(21) Appl. No.: 12/523,107

(22) PCT Filed: Jan. 15, 2008

(86) PCT No.: PCT/KR2008/000248
§ 371 (c)(1),
(2), (4) Date: Jul. 14, 2009

(87) PCT Pub. No.: WO2008/088160
PCT Pub. Date: Jul. 24, 2008

(65) Prior Publication Data
US 2010/0105793 A1  Apr. 29, 2010

(30) Foreign Application Priority Data
Jan. 15, 2007  (KR) ............ 10-2007-0004270

(51) Int. Cl.
C08F 2/50 (2006.01)
G03F 7/004 (2006.01)
G03F 7/038 (2006.01)
G03F 7/027 (2006.01)
G03F 7/028 (2006.01)
G03F 7/032 (2006.01)
C08J 3/28 (2006.01)

(52) U.S. Cl. .......... 430/280.1; 430/286.1; 430/270.1; 430/269; 430/288.1; 522/100; 522/101; 522/103; 522/104; 522/107; 522/74; 522/113; 522/114; 522/120; 522/121; 522/153; 522/154; 522/170; 522/173; 522/179; 522/181; 522/182; 522/910; 428/411.1; 428/413; 428/500

(58) Field of Classification Search .......... 430/286.1, 430/270.1, 141, 269, 280.1, 281.1, 288.1; 522/100, 101, 103, 104, 107, 113, 114, 120, 522/121, 153, 154, 170, 178, 179, 181, 182, 522/910; 428/411.1, 413, 500
See application file for complete search history.

(56) References Cited

U.S. PATENT DOCUMENTS

| 3,639,362 | A |  | 2/1972 | Duling et al. |  |
| 3,681,298 | A |  | 8/1972 | Hurwitz et al. |  |
| 5,965,328 | A |  | 10/1999 | Sano et al. |  |
| 6,294,591 | B1 |  | 9/2001 | Blum et al. |  |
| 6,767,678 | B2 | * | 7/2004 | Yabuuchi et al. | 430/18 |
| 6,929,890 | B2 | * | 8/2005 | Miyoshi et al. | 430/7 |
| 7,097,959 | B1 |  | 8/2006 | Ryu et al. |  |
| 2002/0090573 | A1 |  | 7/2002 | Yabuuchi et al. |  |
| 2004/0197703 | A1 | * | 10/2004 | Miyoshi et al. | 430/270.1 |
| 2005/0042536 | A1 | * | 2/2005 | Cho et al. | 430/141 |
| 2010/0081089 | A1 | * | 4/2010 | Kim et al. | 430/286.1 |

FOREIGN PATENT DOCUMENTS

| CN | 1885163 A | 12/2006 |
| JP | 63-243113 | 10/1988 |
| JP | 08-081530 | 3/1996 |
| JP | 10-007755 | 1/1998 |
| JP | 2002-236363 | 8/2002 |
| JP | 2004-004294 A | 1/2004 |
| KR | 10-1999-0077756 | 10/1999 |
| WO | WO 2008127036 A2 * | 10/2008 |

OTHER PUBLICATIONS

Takahashi et al., "Evaluation of chemically amplified resist based on adamantly methacrylate for 193 nm lithography", Proceedings of SPIE, vol. 2438, Advances in Resist Technology and Processing XII, Jun. 1995, pp. 422-432.

* cited by examiner

*Primary Examiner* — Sanza McClendon
(74) *Attorney, Agent, or Firm* — McKenna Long & Aldridge LLP

(57) ABSTRACT

The present invention relates to a polymer resin compound including a new polycyclic compound, and a photosensitive resin composition including the polymer resin compound as an effective binder matrix. In particular, the photosensitive resin composition according to the present invention uses a polymer resin compound, which includes a compound having double cyclic structure in one molecule as a monomer, as a binder matrix. Accordingly, the photosensitive resin composition has an excellent photosensitivity and an excellent developing property, and has a low distortion property during plastic processing. For this reason, the photosensitive resin composition has an advantage of curing various transparent photosensitive materials used to manufacture a color filter of a liquid crystal display, for example, a column spacer, an overcoat, a passivation material, and the like.

15 Claims, No Drawings

US 8,361,696 B2

POLYMER RESIN COMPOUNDS AND PHOTORESIST COMPOSITION INCLUDING NEW POLYMER RESIN COMPOUNDS

This application claims the benefit of PCT/KR2008/000248, filed on Jan. 15, 2008, and Korean Patent Application No. 10-2007-0004270, filed on Jan.15, 2007, both of which are hereby incorporated herein by reference for all purposes in their entireties.

TECHNICAL FIELD

The present invention relates to a photosensitive resin composition that including a polymer resin compound, which contains a monomer ingredient having polycyclic structure in one molecule, as an effective binder matrix material, and more particularly, to a transparent photosensitive resin composition. When the polymer resin composition is used as a binder matrix material, a transparent thin film used in a liquid crystal display can be quickly cured in the form of a pattern or a film formed on the entire surface, scum is not formed during development, and a pattern has a low distortion property during plastic processing, thereby forming a pattern having a substantially vertical shape.

This application claims priority from Korean Patent Application No. 10-2007-0004270 filed on Jan. 15, 2007 in the KIPO, the disclosure of which is incorporated herein by reference in its entirety.

BACKGROUND ART

A photosensitive resin composition is applied on a substrate, and forms a coating film. The entire coating film is exposed, so that an insulation film or a passivation film is formed. Alternatively, after a specific portion of the coating film is covered with a photomask and then exposed using light, unexposed portions of the coating film are removed by development. In this way, the photosensitive resin composition may be used to form a pattern.

Since being capable of being polymerized and cured by the radiation of light, the photosensitive resin composition is used for a photocurable ink, a photosensitive printing plate, various photoresists, a color filter photoresist for a LCD (Liquid Crystal Display), a photoresist for a resin black matrix, a transparent photosensitive material, or the like.

Among them, the transparent photosensitive resin composition is used for a column spacer, an overcoat, and a passivation film. In general, the transparent photosensitive resin composition means liquid composition that does not use coloring matters such as pigments and includes an alkali soluble resin, a polymerizable compound having an ethylenically unsaturated bond, a photopolymerization initiator, and a solvent. As the LCD has been used for quality enhancement and diversification, the LCD has been manufactured for a liquid crystal display device, such as a TV and a monitor, other than a laptop computer and a mobile device. Further, there has been a demand for a material that quickly reacts to light and has excellent mechanical properties in order to improve productivity and durability. When a pattern is formed by photolithography or an insulating passivation film is formed by exposing the entire surface, a property quickly reacting to light, that is, photosensitivity is a very important factor. Further, when a pattern is formed, portions not reacting to light should completely removed not to pollute a liquid crystal layer or cause troubles in the next process. Furthermore, the mechanical property of a column spacer pattern serving as a support should be excellent so that the liquid crystal display device is not damaged by an impact applied from the outside and normally functions. This demand can be achieved by the increase of an upper area of the pattern.

An alkali soluble resin functions as a binder matrix in a photosensitive resin composition, and the amount thereof to be added is largest. The structure of the alkali soluble resin should be optimized according to the purpose thereof so that the portions not reacting to light are removed as soon as possible by an alkali aqueous solution and quickly react to light, and distortion is minimized due to plastic processing in which heat is applied. When a column spacer is formed on the overcoat thin film, the property completely removed by the alkali aqueous solution becomes particularly important. In general, the overcoat is an organic thin film that is formed by crosslinking a resin composition with light or heat. For this reason, the overcoat has large affinity for a polymer of the column spacer and a cross-linker in comparison with an Indium-Tin Oxide that is an inorganic thin film. Therefore, when the column spacer resin composition not reacting to light is removed by an alkali aqueous solution, the column spacer resin composition may not be completely removed and remain on the overcoat in the form of a small grain. After that, when an alignment layer is processed in a mechanical rubbing process so that liquid crystal is aligned, the column spacer resin composition may cause scratches as a foreign substance. Further, when a crosslinkage is quickly performed due to excellent reactivity to light, the structure of the crosslinked polymer becomes denser. As a result, it is possible to obtain advantages of decreasing the pollution sources of liquid crystal, increasing a residual film ratio of the pattern, and increasing availability of other raw materials in the manufacture of a composition. The small thermal deformation during plastic processing is closely linked to the apparent strength of the pattern. The thickness of a column spacer is reduced and the shape of an upper portion thereof is changed after the plastic processing in comparison with before the plastic processing. If the change is large, the area of the portion supporting a thin film transistor substrate is decreased and the resistance of a panel against an external force is decreased. Accordingly, maintaining the area of the portion supporting a thin film transistor substrate by reducing the change in the plastic processing is closely linked to maintaining the mechanical properties of the column spacer.

In order to achieve these characteristics, when an alkali soluble resin is formed, various functional monomers need to be contained by the copolymerization so that the structure thereof is optimized. It is effective that the appropriate amount of the monomers, which have advantages corresponding to the above-mentioned characteristics, is added and copolymerized. If the molecular weight and the acid value of the polymer obtained in this way are adjusted, it is possible to obtain desired effects without separate additives.

The following polymer resin has been used in a transparent photosensitive resin composition known until now. In the polymer resin, a methyl methacrylic acid containing a carboxylic acid so as to be removed by alkali and a copolymer of benzyl methacrylate giving adhesive strength to the pattern are used as base materials, and various functional monomers are added to the base materials. For example, the following method has been disclosed in Korean patent application publication No. 2001-0018075. In the method, a self-curable material is added to the polymer resin having the above-mentioned structure, so that a chemical bond is reinforced at a portion crosslinked by light. Accordingly, the difference in solubility is improved, the resolution is increased, and the amount of a crosslinked compound to be used is reduced. However, according to this method, it is not possible to improve the developing property of a portion that is not exposed by light. Therefore, there are disadvantages in that the pollution of liquid crystal or problems caused by a mechanical rubbing process for aligning liquid crystal cannot be solved. An additive including an organic acid such as a carboxylic acid may be used to minimize the disadvantages. However, there are possibilities in that the additive is expensive or has low solubility and becomes a pollution source of liquid crystal. Due to the possibilities, the additive is limitedly used.

For this reason, it is not possible to obtain desired effects, and a polymer resin capable of minimizing accompanying disadvantages needs to be developed.

DISCLOSURE OF INVENTION

Technical Problem

In order to solve the problem in the related art, an object of the present invention is to provide a photosensitive resin composition in which a polymer, which is obtained by adding and copolymerizing a monomer composed of a polycyclic compound in one molecule, is used as a binder matrix material, thereby having an excellent photosensitivity, a developing property, which is improved at a portion that is not crosslinked by light, against alkali, and a low distortion property against heat.

Technical Solution

In order to achieve the object, the present invention provides an alkali soluble polymer resin compound comprising a monomer having polycyclic structure represented by Formula 1.

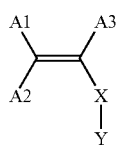

[Formula 1]

In Formula 1, A1, A2, and A3 are the same or different from one another, and are each independently selected from the group consisting of hydrogen, $C_1$ to $C_6$ alkyl, $C_1$ to $C_6$ haloalkyl, $C_1$ to $C_6$ alkyl including one or more heteroatoms, substituted or un-substituted $C_6$ to $C_{20}$ aryl, and $C_2$ to $C_5$ alkyl carboxylic acids.

X is selected from —$(CH_2)_n$—, —O—, —S—, —NH—, —C(O)O—, the substitutes thereof, and the oxides thereof, where n is an integer of 1 to 4.

Y is a group formed from a compound represented by Formula 2 or 3.

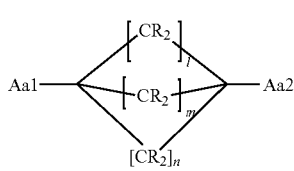

[Formula 2]

In Formula 2, l, m, and n are the same or different from one another, and are each independently an integer of 1 to 6.

Aa1, Aa2, and R are the same or different from one another, and are each independently selected from the group consisting of hydrogen, $C_1$ to $C_6$ alkyl, $C_1$ to $C_6$ haloalkyl, $C_1$ to $C_6$ alkyl including one or more heteroatoms, substituted or unsubstituted $C_6$ to $C_{20}$ aryl, and $C_2$ to $C_5$ alkyl carboxylic acids.

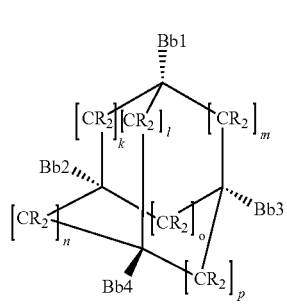

[Formula 3]

In Formula 3, k, l, m, n, o, and p are the same or different from one another, and are each independently an integer of 1 to 4.

Bb1, Bb2, Bb3, Bb4, and R are the same or different from one another, and are each independently selected from the group consisting of hydrogen, $C_1$ to $C_6$ alkyl, $C_1$ to $C_6$ haloalkyl, $C_1$ to $C_6$ alkyl including one or more heteroatoms, substituted or un-substituted $C_6$ to $C_{20}$ aryl, and $C_2$ to $C_5$ alkyl carboxylic acids.

A group, which is formed from the compounds represented by Formula 2 or 3, means the structure in which one hydrogen is separated from the structure represented by Formulas 2 and 3 and can form a covalent bond together with X of Formula 1. A position to be bonded to X is not particularly limited as long as hydrogen can be substituted.

Further, the present invention provides a photosensitive resin composition including 1) 2 to 20% by weight of the alkali soluble polymer resin compound including the monomer represented by Formula 1; 2) 0.5 to 50% by weight of a polymerizable compound having an ethylenically unsaturated bond; 3) 0.1 to 20% by weight of a radical initiator having optical activity; and 4) 10 to 95% by weight of a solvent.

Furthermore, the present invention provides a method of manufacturing a transparent thin film using the photosensitive resin composition.

Advantageous Effects

The photosensitive resin composition according to the present invention uses a polymer compound, which includes a polycyclic compound, as an effective binder matrix material. Accordingly, the photosensitivity of the photosensitive resin composition is excellent, the developing property is improved, and a pattern has a low distortion property during a heat treatment process. For this reason, the photosensitive resin composition has an advantage of curing a column spacer, an overcoat, and a passivation material of a liquid crystal display, and can reduce an error rate in the process.

BEST MODE FOR CARRYING OUT THE INVENTION

The present invention will be described in more detail below.

An alkali soluble polymer resin compound according to the present invention includes a monomer having polycyclic structure that is represented by Formula 1.

In Formula 1, Formula 2, and Formula 3, A1, A2, A3, Aa1, Aa2, Bb1, Bb2, Bb3, Bb4, and R are the same or different from one another. It is preferable that each of them independently be a hydrogen or methyl group. However, they are not limited thereto.

When A1, A2, A3, Aa1, Aa2, Bb1, Bb2, Bb3, Bb4, or R is aryl in Formula 1, Formula 2, and Formula 3, it is preferable that the aryl be phenyl. However, the aryl is not limited thereto.

When X is substitutes of —$(CH_2)_n$— or —NH— in Formula 1, H of the —$(CH_2)_n$— or —NH— may be substituted by one of a group consisting of $C_1$ to $C_{20}$ alkyl, $C_1$ to $C_{20}$ haloalkyl, $C_6$ to $C_{20}$ aryl, and $C_2$ to $C_{20}$ alkyl carboxylic acids.

When A1, A2, A3, Aa1, Aa2, Bb1, Bb2, Bb3, Bb4, or R is alkyl including heteroatoms in Formula 1, Formula 2, and Formula 3, it is preferable that the heteroatom be N, O, or S. However, the heteroatom is not limited thereto.

It is preferable that a compound where Y of Formula 1 is represented by Formula 2 be isobornyl methacrylate or dicyclopentanyl methacrylate. However, the compound is not limited thereto.

It is preferable that a compound where Y of Formula 1 is represented by Formula 3 be 1-adamantyl methacrylate. However, the compound is not limited thereto.

A polymer resin compound, which includes a monomer represented by Formula 1, according to the present invention is bulky in comparison with a known substituent and has a geometrical shape substantially similar to a spherical shape. Accordingly, the polymer resin compound according to the present invention interferes with a reaction during a photocuring reaction, and prevents the entanglement of polymer chains, that is, a washing trouble when a portion not crosslinked by alkali is removed. As a result, photosensitivity and a developing property can be improved. Further, since the polymer resin compound according to the present invention prevents the movement between the polymer chains at high temperature, it is possible to form pattern that has a low heat distortion property.

Further, a photosensitive resin composition according to the present invention includes 1) 2 to 20% by weight of an alkali soluble polymer resin compound that includes a monomer represented by Formula 1; 2) 0.5 to 50% by weight of a polymerizable compound having an ethylenically unsaturated bond; 3) 0.1 to 20% by weight of a radical initiator having optical activity; and 4) 10 to 95% by weight of a solvent.

In the photosensitive resin composition according to the present invention, a copolymer of a compound including an acid functional group and a monomer represented by Formula 1, or a compound that is manufactured by the polymer reaction between the copolymer and the ethylenically unsaturated compound containing an epoxy group may be used as the 1) alkali soluble polymer resin compound.

Further, the copolymer may further include a monomer that increases the strength of a film.

It is preferable that 3 to 50 mole % of the monomer represented by Formula 1 be copolymerized in the 1) alkali soluble polymer resin compound. If the content of the monomer is less then 3 mole %, it is difficult to obtain the advantage of the present invention. If the content of the monomer is more than 50 mole %, a developing property is excessively improved, so that the pattern may be separated.

Examples of the compound including the acid functional group include a (meth)acrylic acid, a crotonic acid, an itaconic acid, a maleic acid, a fumaric acid, a monomethyl maleic acid, an isoprene sulfonic acid, a styrene sulfonic acid, a 5-norbornene-2-carboxylic acid, mono-2-((meth)acryloyloxy)ethyl phthalate, mono-2-((meth)acryloyloxy)ethyl succinate, ω-carboxylic polycaprolactone mono(meth)acrylate, and the mixture thereof. However, the compound is not limited thereto.

Examples of the monomer increasing the strength of a film include unsaturated carboxylic acid esters, such as benzyl (meth)acrylate, methyl(meth)acrylate, ethyl(meth)acrylate, butyl(meth)acrylate, dimethylaminoethyl(meth)acrylate, isobutyl(meth)acrylate, t-butyl(meth)acrylate, cyclohexyl (meth)acrylate, isobornyl(meth)acrylate, ethylhexyl(meth) acrylate, 2-phenoxyethyl(meth)acrylate, tetrahydrofurfuryl (meth)acrylate, hydroxyethyl(meth)acrylate, 2-hydroxypropyl(meth)acrylate, 2-hydroxy-3-chloropropyl (meth)acrylate, 4-hydroxybutyl(meth)acrylate, acyloctyloxy-2-hydroxypropyl(meth)acrylate, glycerol(meth)acrylate, 2-methoxyethyl(meth)acrylate, 3-methoxybutyl(meth) acrylate, ethoxydiethylene glycol (meth)acrylate, methoxytriethylene glycol(meth)acrylate, methoxytripropylene glycol(meth)acrylate, poly(ethylene glycol) methylether (meth)acrylate, phenoxydiethylene glycol(meth)acrylate, p-nonylphenoxypolyethylene glycol(meth)acrylate, p-nonylphenoxypolypropylene glycol(meth)acrylate, tetrafluoropropyl(meth)acrylate, 1,1,1,3,3,3-hexafluoroisopropyl (meth)acrylate, octafluoropentyl(meth)acrylate, heptadecafluorodecyl(meth)acrylate, tribromophenyl(meth) acrylate, methyl α-hydroxymethyl acrylate, ethyl α-hydroxymethyl acrylate, propyl α-hydroxymethyl acrylate, butyl α-hydroxymethyl acrylate, dicyclopentanyl (meth) acrylate, dicyclopentenyl (meth)acrylate, dicyclopentanyl oxyethyl (meth)acrylate, and dicyclopentenyl oxyethyl (meth)acrylate; aromatic vinyls, such as styrene, α-methylstyrene, (o,m,p)-vinyl toluene, (o,m,p)-methoxystyrene, and (o,m,p)-chloro styrene; unsaturated ethers, such as vinyl methyl ether, vinyl ethyl ether, and allyl glycidyl ether; N-vinyl tertiary amines, such as N-vinyl pyrrolidone, N-vinyl carbazole, and N-vinyl morpholine; unsaturated imides, such as N-phenylmaleimide, N-(4-chlorophenyl)maleimide, N-(4-hydroxyphenyl)maleimide, and N-cyclohexyl maleimide; maleic anhydrides, such as maleic anhydride and methyl maleic anhydride; unsaturated glycidyl compounds, such as allyl glycidyl ether, glycidyl (meth)acrylate, and 3,4-epoxycyclohexylmethyl (meth)acrylate; and the mixture thereof. However, the monomer is not limited thereto.

It is preferable that the ethylenically unsaturated compound containing an epoxy group be one or more selected from the group consisting of allyl glycidyl ether, glycidyl (meth)acrylate, 3,4-epoxycyclohexylmethyl (meth)acrylate, glycidyl 5-norbornene-2-methyl-2-carboxylate(endo, exo mixture), 1,2-epoxy-5-hexene, and 1,2-epoxy-9-decene. However, the ethylenically unsaturated compound is not limited thereto.

Further, one material or the combination of two or more materials may be used as the 1) alkali soluble polymer resin compound.

It is preferable that the content of the 1) alkali soluble polymer resin compound be in the range of 2 to 20% by weight in the photosensitive resin composition according to the present invention. If the content of the alkali soluble polymer resin compound is less than 2% by weight, viscosity is excessively decreased. For this reason, there is a possibility that a thin film is not satisfactorily formed. Further, since an acid value is decreased, it is difficult to develop the thin film. If the content of the alkali soluble polymer resin compound is more than 20% by weight, the amount of a polymer ingredient is increased, so that viscosity is excessively increased. For this reason, it is difficult to form a thin film having a desired thickness.

Furthermore, it is preferable that the acid value of the 1) alkali soluble polymer resin compound be in the range of 30 to 300 KOH mg/g. If the acid value is less than 30 KOH mg/g, it is difficult to develop the thin film, so that clear pattern cannot be obtained. If the acid value is more than 300 KOH mg/g, a developing property is excessively improved, so that the pattern may be separated.

In addition, it is preferable that the weight-average molecular weight of the 1) alkali soluble polymer resin compound be in the range of 1,000 to 200,000, and it is more preferable that the molecular weight of the alkali soluble polymer resin compound be in the range of 5,000 to 50,000. If the molecular weight is less than 1,000, it is not possible to obtain a reliable pattern and thermal resistance deteriorates. If the molecular weight is more than 200,000, the viscosity of a solution is excessively increased, so that it is difficult to uniformly apply the solution.

In the photosensitive resin composition according to the present invention, one or more selected from the group consisting of compounds obtained by esterifying polyhydric alcohol, such as ethylene glycol di(meth)acrylate, polyethylene glycol di(meth)acrylate including 2 to 14 ethylene groups, trimethylolpropane di(meth)acrylate, trimethylolpropane tri(meth)acrylate, pentaerythritol tri(meth)acrylate, pentaerythritol tetra(meth)acrylate, 2-trisacryloyloxymethylethylphthalic acid, propylene glycol di(meth)acrylate including 2 to 14 propylene groups, dipentaerythritol penta(meth)acrylate, dipentaerythritol hexa(meth)acrylate, and the mixture of an acidic modification of dipentaerythritol penta(meth)acrylate and dipentaerythritol hexa(meth)acrylate (trade mark: TO-2348, TO-2349 manufactured by Japanese Toagosei Co., Ltd.), with $\alpha,\beta$-unsaturated carboxylic acids; compounds obtained by adding a (meth)acrylic acid to a compound containing glycidyl group, such as a trimethylolpropane triglycidyletheracrylic acid adduct and a bisphenol A diglycidyletheracrylic acid adduct; ester compounds obtained from a polyhydric carboxylic acid and a compound having a hydroxyl group or an ethylenically unsaturated bond, such as phthalic acid diester of $\beta$-hydroxyethyl(meth)acrylate and toluene diisocyannate adduct of $\beta$-hydroxyethyl(meth)acrylate, or adduct with polyisocyanate; (meth)acrylic acid alkyl esters, such as methyl(meth)acrylate, ethyl(meth)acrylate, butyl(meth)acrylate, and 2-ethylhexyl(meth)acrylate; and 9,9'-bis[4-(2-acryloyloxyethoxy)phenyl]fluorine may be used as the 2) polymerizable compound having an ethylenically unsaturated bond. However, the polymerizable compound is not limited thereto, and materials known in the art may be used as the polymerizable compound. Further, if necessary, a silica dispersing agent may be used in these compounds. For example, Nanocryl XP series (0596, 1045, 21/1364) and Nanopox XP series (0516, 0525) manufactured by Hanse Chemie Corp. may be used, but the polymerizable compound is not limited thereto.

It is preferable that the content of the 2) polymerizable compound having an ethylenically unsaturated bond be in the range of 0.5 to 50% by weight in the photosensitive resin composition according to the present invention. If the content of the polymerizable compound is less than 0.5% by weight, it is not possible to obtain a desired polymerization effect. If the content of the polymerizable compound is more than 50% by weight, a developing property may deteriorate with respect to a developing solution.

In the photosensitive resin composition according to the present invention, one material or the combination of two or more materials may be used as the 3) radical initiator having optical activity. Examples of the material include triazine compounds, such as 2,4-trichloromethyl-(4'-methoxyphenyl)-6-triazine, 2,4-trichloromethyl-(4'-methoxystyryl)-6-triazine, 2,4-trichloromethyl-(pyflonyl)-6-triazine, 2,4-trichloromethyl-(3',4'-dimethoxyphenyl)-6-triazine, 3-{4-[2,4-bis(trichloromethyl)-6-triazine-6-yl] phenylthio}propanoic acid, 2,4-trichloromethyl-(4'-ethylbiphenyl)-6-triazine, and 2,4-trichloromethyl-(4'-methylbiphenyl)-6-triazine; biimidazole compounds, such as 2,2'-bis(2-chlorophenyl)-4,4',5,5'-tetraphenyl biimidazole, and 2,2'-bis(2,3-dichlorophenyl)-4,4',5,5'-tetraphenylbiimidazole; acetophenone compounds, such as 2-hydroxy-2-methyl-1-phenylpropane-1-on, 1-(4-isopropylphenyl)-2-hydroxy-2-methylpropane-1-on, 4-(2-hydroxyethoxy)-phenyl (2-hydroxy)propyl ketone, 1-hydroxycyclohexyl phenyl ketone, 2,2-dimethoxy-2-phenyl acetophenone, 2-methyl-(4-methylthiophenyl)-2-morpholino-1-propane-1-on(Irgacure-907), and 2-benzyl-2-dimethylamino-1-(4-morpholinophenyl)-butane-1-on(Irgacure-369); O-acyloxime compounds, such as Irgacure OXE 01 and Irgacure OXE 02 manufactured by Ciba Geigy Corp.; benzophenone compounds, such as 4,4'-bis(dimethylamino)benzophenone, and 4,4'-bis(diethylamino)benzophenone; thioxanthone compounds, such as 2,4-diethyl thioxanthone, 2-chloro thioxanthone, isopropyl thioxanthone, and diisopropyl thioxanthone; phosphine oxide compounds, such as 2,4,6-trimethylbenzoyl diphenylphosphine oxide, bis(2,6-dimethoxybenzoyl)-2,4,4-trimethylpentyl phosphine oxide, and bis(2,6-dichlorobenzoyl) propyl phosphine oxide; and coumarin compounds, such as 3,3'-carbonylvinyl-7-(diethylamino)coumarin, 3-(2-benzothiazolyl)-7-(diethylamino)coumarin, 3-benzoyl-7-(diethylamino)coumarin, 3-benzoyl-7-methoxy-coumarin, 10,10'-carbonylbis[1,1,7,7-tetramethyl-2,3,6,7-tetrahydro-1H,5H,11H—Cl]-benzopyran o[6,7,8-ij]-quinolizin-11-one. However, the radical initiator is not limited thereto.

It is preferable that the content of the 3) radical initiator having optical activity be in the range of 0.1 to 20% by weight in the photosensitive resin composition according to the present invention. If the content of the radical initiator is less than 0.1% by weight, photosensitivity is decreased. If the content of the radical initiator is more than 20% by weight, there is a possibility that the initiator remaining without being reacted by light causes a side reaction such as yellowing.

In the photosensitive resin composition according to the present invention, examples of the 4) solvent include methyl ethyl ketone, methyl cellosolve, ethyl cellosolve, ethylene glycol dimethyl ether, ethylene glycol diethyl ether, propylene glycol dimethyl ether, propylene glycol diethyl ether, diethylene glycol dimethyl ether, diethylene glycol diethyl ether, diethylene glycol methyl ethyl ether, 2-ethoxy propanol, 2-methoxy propanol, 3-methoxy butanol, cyclohexanone, cyclopentanone, propylene glycol methyl ether acetate, propylene glycol ethyl ether acetate, 3-methoxybutyl acetate, ethyl 3-ethoxypropionate, ethyl cellosolve acetate, methyl cellosolve acetate, butyl acetate, dipropylene glycol monomethyl ether, and the mixture thereof. However, the solvent is not limited thereto.

It is preferable that the content of the 4) solvent be in the range of 10 to 95% by weight in the photosensitive resin composition according to the present invention. If the content of the solvent is less than 10% by weight, it is difficult to sufficiently dissolve constituents. If the content of the solvent is more than 95% by weight, the viscosity of the entire solution is decreased, so that it is not possible to maintain the thickness of a film uniform during the coating.

The photosensitive resin composition according to the present invention may further include one or more additives, such as a curing accelerator, a thermal polymerization inhibitor, a plasticizer, an adhesion promoter, a filler, and a surfactant, if necessary.

One or more selected from the group consisting of 2-mercaptobenzoimidazole, 2-mercaptobenzothiazole, 2-mercaptobenzoxazole, 2,5-dimercapto-1,3,4-thiadiazole, 2-mercapto-4,6-dimethylaminopyridine, pentaerythritol tetrakis(3-mercaptopropionate), pentaerythritol tris(3-mercaptopropionate), pentaerythritol tetrakis(2-mercaptoacetate), pentaerythritol tris(2-mercaptoacetate), trimethylolpropane tris(2-mercaptoacetate), trimethylolpropane tris(3-mercaptopropionate), trimethylolethane tris(2-mercaptoacetate), and trimethylolethane tris(3-mercaptopropionate) may be used as the curing accelerator. However, the curing accelerator is not limited thereto, and materials known in the art may be used.

One or more selected from the group consisting of p-anisole, hydroquinone, pyrocatechol, t-butyl catechol, N-nitrosophenylhydroxyamine ammonium salt, N-nitrosophenylhydroxyamine aluminum salt, and phenothiazine may be used as the thermal polymerization inhibitor. However, the thermal polymerization inhibitor is not limited thereto, and materials known in the art may be used.

All of the compounds that may be included in the photosensitive resin composition in the related art may be also used as the plasticizer, the adhesion promoter, the filler, and the surfactant.

It is preferable that the content of the additive be in the range of 0.01 to 10% by weight in the photosensitive resin composition according to the present invention. If the content of the additive is less than 0.01% by weight, it is difficult to obtain a desired effect. If the content of the additive is more than 10% by weight, there is a possibility that a side reaction is caused by a reaction to other ingredient.

The photosensitive resin composition according to the present invention is used for a roll coater, a curtain coater, a spin coater, a slot die coater, various printing, and deposition, and may be applied on supports, such as a metal substrate, a paper substrate, a glass substrate, and a plastic substrate. Further, after being applied on a support such as a film, the photosensitive resin composition may be transferred onto other support. Alternatively, after being applied on a first support, the photosensitive resin composition may be transferred onto a blanket and then transferred onto a second support. The method of applying the photosensitive resin composition is not particularly limited.

For example, a mercury vapor arc, a carbon arc, a Xe arc, or the like, which emits light having a wavelength of 250 to 450 nm, may be used as a light source for curing the photosensitive resin composition according to the present invention. However, the light source is not limited thereto.

The photosensitive resin composition according to the present invention may be used to manufacture photocurable paints, photocurable ink, a transparent photosensitive resin composition used for manufacturing a TFT (Thin Film Transistor) LCD color filter, a pigment dispersed photosensitive resin composition, and a photosensitive resin composition used for manufacturing a black matrix of a TFT LCD or an organic light-emitting diode. In particular, the photosensitivity of the photosensitive resin composition is excellent, the developing property is improved, and a pattern is slightly deformed during a heat treatment process. For this reason, the photosensitive resin composition may be used to cure various transparent photosensitive materials used to manufacture a color filter of a liquid crystal display, for example, a column spacer, an overcoat, a passivation material, and the like. The use of the photosensitive resin composition is not limited thereto.

Further, the present invention provides a method of manufacturing a transparent thin film for a liquid crystal display that uses the photosensitive resin composition according to the present invention.

The transparent thin film for a liquid crystal display may be manufactured by using a general manufacturing method known in the art except for using the photosensitive resin composition according to the present invention. For example, the transparent thin film may be manufactured on a glass substrate or a plastic substrate, such as a silicon wafer, by using a spin coating method, a roll coating method, a spray coating method, or the like.

Mode for the Invention

The present invention will be described in more detail by the following Examples. However, the following Examples are illustrative only, and do not limit the scope of the present invention.

EXAMPLES

Manufacture of Alkali Soluble Polymer Resin Compound

Synthetic Example 1

After 3 parts by weight of V-65 as a thermal initiator was dissolved in a solvent in a reactor, isobornyl methacrylate and a methacrylic acid were supplied at a molar ratio of 30% and 70%, respectively. Then, this mixture was reacted for 12 hours while being maintained under the nitrogen atmosphere at 60° C. The mole content ratios of the isobornyl methacrylate and the methacrylic acid of an obtained reactive binder were 30% and 70%, respectively, like when being supplied. This copolymer solution was supplied to a flask having an agitator and heated up to a temperature of 110° C., and glycidyl methacrylate was added. Then, this mixture was reacted until epoxy groups were completely removed, thereby synthesizing a copolymer so that the mole content ratio of the methacrylic acid became 25%. The acid value of the obtained copolymer was 117 KOH mg/g, and the molecular weight (Mw) thereof was 11,300.

Peaks identified by magnetic resonance spectrum analysis were 1H NMR (DMSO-d6): 0.78 to 0.85 (br, 6H), 0.97 to 0.99 (br, 3H), 1.02 to 1.80 (br, 13H), 1.85 to 1.87 (s, 3H), and 4.62 to 4.65 (d, 1H).

Synthetic Example 2

Synthesis was performed by using the same method as Synthetic example 1 except that 1-adamantyl methacrylate was used instead of isobornyl methacrylate. The mole content ratios of the 1-adamantyl methacrylate and the methacrylic acid of an obtained reactive binder were 30% and 70%, respectively. This copolymer solution was supplied to a flask having an agitator and heated up to a temperature of 110° C., and glycidyl methacrylate was added. Then, this mixture was reacted until epoxy groups were completely removed, thereby synthesizing a copolymer so that the mole content ratio of the methacrylic acid became 25%. The acid value of the obtained copolymer was 115 KOH mg/g, and the molecular weight (Mw) thereof was 11,400.

Peaks identified by magnetic resonance spectrum analysis were 1H NMR (DMSO-d6): 0.80 to 1.05 (br, 6H), 1.63 (br, 6H), 1.82 (s, 3H), and 2.02 to 2.23 (br, 9H).

Synthetic Example 3

Synthesis was performed by using the same method as Synthetic example 1 except that dicyclopentanyl methacrylate was used instead of isobornyl methacrylate. The mole content ratios of the dicyclopentanyl methacrylate and the methacrylic acid of an obtained reactive binder were 30% and 70%, respectively. This copolymer solution was supplied to a flask having an agitator and heated up to a temperature of 110° C., and glycidyl methacrylate was added. Then, this mixture was reacted until epoxy groups were completely removed, thereby synthesizing a copolymer so that the mole content ratio of the methacrylic acid became 25%. The acid value of the obtained copolymer was 115 KOH mg/g, and the molecular weight (Mw) thereof was 11,400.

Peaks identified by magnetic resonance spectrum analysis were 1H NMR (DMSO-d6): 0.80 to 1.10 (br, 2H), 1.15 to 1.50 (br, 4H), 1.55 to 2.20 (br, 11H), 4.50 to 4.61 (d, 1H).

Example 1

8 parts by weight of an alkali soluble polymer resin compound prepared in Synthetic example 1, 16 parts by weight of dipentaerythritol hexaacrylate that is a polymerizable compound, 1 part by weight of 2-benzyl-2-dimethylamino-1-(4-morpholinophenyl)-butane-1-on (trade mark: Irgacure-369 manufactured by Ciba Geigy Corp.) as a photopolymerization initiator, and 79 parts by weight of PGMEA (propylene glycol monomethyl ether acetate) that is an organic solvent were mixed with each other for 3 hours by a shaker. This mixed photosensitive solution was filtered by using a filter corresponding to 5 microns, and spin-coated on glass. Then, a pre-heat treatment was performed for 2 minutes at about 100° C., so that a film having a uniform thickness of about 2.5□ was formed.

After the film was exposed to a high pressure mercury lamp by using a photomask having a circular isolated pattern of a diameter of 30□, the pattern was developed by a KOH alkali aqueous solution having the pH in the range of 11.3 to 11.7. Then, the film was washed by deionized water. After a post-heat treatment was performed on the film for 40 minutes at about 200° C., the pattern was observed by using an optical microscope and a pattern profiler.

Example 2

8 parts by weight of an alkali soluble polymer resin compound prepared in Synthetic example 1, 16 parts by weight of dipentaerythritol hexaacrylate that is a polymerizable compound, 1 part by weight of 2-methyl-(4-methylthiophenyl)-2-morpholino-1-propane-1-on (Irgacure-907 manufactured by Ciba Geigy Corp.) as a photopolymerization initiator, and 79 parts by weight of PGMEA that is an organic solvent were mixed with each other for 3 hours by a shaker. This mixed photosensitive solution was filtered by using a filter corresponding to 5 microns, and spin-coated on glass. Then, a pre-heat treatment was performed for 2 minutes at about 100° C., so that a film having a uniform thickness of about 2.5□ was formed.

After the film was exposed to a high pressure mercury lamp by using a photomask having a circular isolated pattern of a diameter of 30□, the pattern was developed by a KOH alkali aqueous solution having the pH in the range of 11.3 to 11.7. Then, the film was washed by deionized water. After a post-heat treatment was performed on the film for 40 minutes at about 200° C., the pattern was observed by using an optical microscope and a pattern profiler.

Example 3

8 parts by weight of an alkali soluble polymer resin compound prepared in Synthetic example 2, 16 parts by weight of dipentaerythritol hexaacrylate that is a polymerizable compound, 1 part by weight of 2-benzyl-2-dimethylamino-1-(4-morpholinophenyl)-butane-1-on (trade mark: Irgacure-369 manufactured by Ciba Geigy Corp.) as a photopolymerization initiator, and 79 parts by weight of PGMEA that is an organic solvent were mixed with each other for 3 hours by a shaker. This mixed photosensitive solution was filtered by using a filter corresponding to 5 microns, and spin-coated on glass. Then, a pre-heat treatment was performed for 2 minutes at about 100° C., so that a film having a uniform thickness of about 2.5□ was formed.

After the film was exposed to a high pressure mercury lamp by using a photomask having a circular isolated pattern of a diameter of 30□, the pattern was developed by a KOH alkali aqueous solution having the pH in the range of 11.3 to 11.7. Then, the film was washed by deionized water. After a post-heat treatment was performed on the film for 40 minutes at about 200° C., the pattern was observed by using an optical microscope and a pattern profiler.

Example 4

8 parts by weight of an alkali soluble polymer resin compound prepared in Synthetic example 2, 16 parts by weight of dipentaerythritol hexaacrylate that is a polymerizable compound, 1 part by weight of 2-methyl-(4-methylthiophenyl)-2-morpholino-1-propane-1-on (Irgacure-907 manufactured by Ciba Geigy Corp.) as a photopolymerization initiator, and 79 parts by weight of PGMEA that is an organic solvent were mixed with each other for 3 hours by a shaker. This mixed photosensitive solution was filtered by using a filter corresponding to 5 microns, and spin-coated on glass. Then, a pre-heat treatment was performed for 2 minutes at about 100° C., so that a film having a uniform thickness of about 2.5□ was formed.

After the film was exposed to a high pressure mercury lamp by using a photomask having a circular isolated pattern of a diameter of 30□, the pattern was developed by a KOH alkali aqueous solution having the pH in the range of 11.3 to 11.7. Then, the film was washed by deionized water. After a post-heat treatment was performed on the film for 40 minutes at about 200° C., the pattern was observed by using an optical microscope and a pattern profiler.

Example 5

8 parts by weight of an alkali soluble polymer resin compound prepared in Synthetic example 3, 16 parts by weight of dipentaerythritol hexaacrylate that is a polymerizable compound, 1 part by weight of 2-benzyl-2-dimethylamino-1-(4-morpholinophenyl)-butane-1-on (trade mark: Irgacure-369 manufactured by Ciba Geigy Corp.) as a photopolymerization initiator, and 79 parts by weight of PGMEA that is an organic solvent were mixed with each other for 3 hours by a shaker. This mixed photosensitive solution was filtered by using a filter corresponding to 5 microns, and spin-coated on glass. Then, a pre-heat treatment was performed for 2 minutes at about 100° C., so that a film having a uniform thickness of about 2.5□ was formed.

After the film was exposed to a high pressure mercury lamp by using a photomask having a circular isolated pattern of a diameter of 30□, the pattern was developed by a KOH alkali aqueous solution having the pH in the range of 11.3 to 11.7. Then, the film was washed by deionized water. After a post-heat treatment was performed on the film for 40 minutes at about 200° C., the pattern was observed by using an optical microscope and a pattern profiler.

Example 6

8 parts by weight of an alkali soluble polymer resin compound prepared in Synthetic example 3, 16 parts by weight of dipentaerythritol hexaacrylate that is a polymerizable compound, 1 part by weight of 2-methyl-(4-methylthiophenyl)-2-morpholino-1-propane-1-on (Irgacure-907 manufactured by Ciba Geigy Corp.) as a photopolymerization initiator, and 79 parts by weight of PGMEA that is an organic solvent were mixed with each other for 3 hours by a shaker. This mixed photosensitive solution was filtered by using a filter corresponding to 5 microns, and spin-coated on glass. Then, a pre-heat treatment was performed for 2 minutes at about 100° C., so that a film having a uniform thickness of about 2.5□ was formed.

After the film was exposed to a high pressure mercury lamp by using a photomask having a circular isolated pattern of a diameter of 30□, the pattern was developed by a KOH alkali aqueous solution having the pH in the range of 11.3 to 11.7. Then, the film was washed by deionized water. After a post-heat treatment was performed on the film for 40 minutes at about 200° C., the pattern was observed by using an optical microscope and a pattern profiler.

Comparative Example 1

Comparative example 1 was the same as Example 1 except that 8 parts by weight of BzMA (benzyl methacrylate)/MAA (methacrylic acid) (mole ratio: 70/30, Mw: 24,000) were used as an alkali soluble polymer resin compound in Example 1.

Comparative Example 2

Comparative example 2 was the same as Example 2 except that 8 parts by weight of BzMA/MAA (mole ratio: 70/30, Mw: 24,000) were used as an alkali soluble polymer resin compound in Example 2.

<Evaluation of Physical Properties of Transparent Photosensitive Composition>

The physical properties of the transparent photosensitive resin compositions manufactured in Examples and Comparative examples were measured as follows, and the results were shown in Table 1.

(1) Photosensitivity

An exposure value where a thickness was not increased any more by using a photomask having a circular isolated pattern of a diameter of 30□ was defined as sensitivity, and the sensitivity was measured while the exposure value was changed. As the exposure value was decreased, the sensitivity became more excellent. Light, which was emitted from the high pressure mercury lamp and corresponded to the entire wavelength without filtering light corresponding to a specific wavelength, was used as a light source, and the exposure value was measured at a wavelength of 365 nm (1-ray).

(2) Developing Property on Overcoat

Roughness was measured on the lower surface of the glass substrate around the pattern by using an atomic force spectroscopy. For the purpose of the accuracy of a co-efficient of roughness, roughness was measured at a square portion corresponding to 500×500 nm. As the roughness was decreased, the developing property became more excellent.

(3) Thermal Deformation

The upper diameters (which were measured relative to a diameter at a portion corresponding to 95% of the thickness) of the patterns formed in the composition examples and Comparative examples was measured before and after the heat treatment (200° C., 40 minutes), and then compared with each other. As the difference between the diameters before and after the heat treatment was decreased, the thermal deformation became small.

TABLE 1

| | Polymer resin compound | Photo polymerization initiator | Photo Sensitivity (mJ/cm$^2$) | Roughness (nm) | Upper diameter of pattern before heat treatment (μm) | Upper diameter of pattern after heat treatment (μm) | Difference in upper diameter before and after heat treatment (μm) |
|---|---|---|---|---|---|---|---|
| Example 1 | Synthetic example 1 | Irgcaure-369 | 155 | 18 | 36 | 31 | 5 |
| Example 2 | Synthetic example 1 | Irgcaure-907 | 165 | 14 | 32 | 30 | 2 |
| Example 3 | Synthetic example 2 | Irgcaure-369 | 145 | 18 | 36 | 32 | 4 |
| Example 4 | Synthetic example 2 | Irgcaure-907 | 160 | 16 | 32 | 30 | 2 |
| Example 5 | Synthetic example 3 | Irgcaure-369 | 150 | 17 | 36 | 32 | 4 |
| Example 6 | Synthetic example 3 | Irgcaure-907 | 160 | 15 | 32 | 30 | 2 |
| Comparative Example 1 | BzMA/MAA | Irgcaure-369 | 210 | 92 | 36 | 28 | 8 |
| Comparative Example 2 | BzMA/MAA | Irgcaure-907 | 270 | 88 | 32 | 26 | 6 |

* Irgcaure-369: 2-benzyl-2-dimethylamino-1-(4-morpholinophenyl)-butane-1-on.
Irgcaure-907: 2-methyl-(4-methylthiophenyl)-2-morpholino-1-propane-1-on.
BzMA: benzyl methacrylate.
MAA: methacrylic acid.

The invention claimed is:

1. An alkali soluble polymer resin compound comprising a monomer of dicyclopentanyl methacrylate,
    wherein the alkali soluble polymer resin compound is prepared by a polymer reaction between:
    a copolymer of a compound including an acid functional group and the monomer of dicyclopentanyl methacrylate, and
    an ethylenically unsaturated compound containing an epoxy group.

2. A photosensitive resin composition comprising:
    1) 2 to 20% by weight of an alkali soluble polymer resin compound including the monomer of dicyclopentanyl methacrylate;
    2) 0.5 to 50% by weight of a polymerizable compound having an ethylenically unsaturated bond;
    3) 0.1 to 20% by weight of a radical initiator having optical activity; and
    4) 10 to 95% by weight of a solvent,
    wherein the alkali soluble polymer resin compound is prepared by a polymer reaction between:
    a copolymer of a compound including an acid functional group and the monomer of dicyclopentanyl methacrylate, and
    the ethylenically unsaturated compound containing an epoxy group.

3. The photosensitive resin composition according to claim 2, wherein the content of the monomer of dicyclopentanyl methacrylate, of the copolymer of the compound including the acid functional group and the monomer of dicyclopentanyl methacrylate is 3 to 50 mole %.

4. The photosensitive resin composition according to claim 2, wherein the compound including the acid functional group is selected from the group consisting of a (meth)acrylic acid, a crotonic acid, an itaconic acid, a maleic acid, a fumaric acid, a monomethyl maleic acid, an isoprene sulfonic acid, a styrene sulfonic acid, a 5-norbornene-2-carboxylic acid, mono-2-((meth)acryloyloxy)ethyl phthalate, mono-2-((meth)acryloyloxy)ethyl succinate, ω-carboxylic polycaprolactone mono(meth)acrylate, and the mixture thereof.

5. The photosensitive resin composition according to claim 2, wherein the ethylenically unsaturated compound containing the epoxy group comprises one or more selected from the group consisting of allyl glycidyl ether, glycidyl (meth)acrylate, 3,4-epoxycyclohexylmethyl (meth)acrylate, glycidyl 5-norbornene-2-methyl-2-carboxylate(endo, exo mixture), 1,2-epoxy-5-hexene, and 1,2-epoxy-9-decene.

6. The photosensitive resin composition according to claim 2, wherein the acid value of the 1) alkali soluble polymer resin compound is 30 to 300 KOH mg/g.

7. The photosensitive resin composition according to claim 2, wherein the weight-average molecular weight of the 1) alkali soluble polymer resin compound is in the range of 1,000 to 200,000.

8. The photosensitive resin composition according to claim 2, wherein the 2) polymerizable compound having an ethylenically unsaturated bond comprises one or more selected from the group consisting of compounds obtained by esterifying polyhydric alcohol with α, β-unsaturated carboxylic acids; compounds obtained by adding a (meth)acrylic acid to a compound containing glycidyl group; an ester compound of a compound including a hydroxyl group or an ethylenically unsaturated bond and a polyhydric carboxylic acid, or an adduct with polyisocyanate; (meth)acrylic acid alkyl ester; and 9,9'-bis[4-(2-acryloyloxyethoxy)phenyl]fluorene.

9. The photosensitive resin composition according to claim 2, wherein the 3) radical initiator having optical activity is any one selected from the group consisting of a triazine compound, a biimidazole compound, an acetophenone compound, an O-acyloxime compound, a benzophenone compound, a thioxanthone compound, a phosphine oxide compound, a coumarin compound, and a mixture thereof.

10. The photosensitive resin composition according to claim 2, wherein the 4) solvent is any one selected from the group consisting of methyl ethyl ketone, methyl cellosolve, ethyl cellosolve, ethylene glycol dimethyl ether, ethylene glycol diethyl ether, propylene glycol dimethyl ether, propylene glycol diethyl ether, diethylene glycol dimethyl ether, diethylene glycol diethyl ether, diethylene glycol methyl ethyl ether, 2-ethoxy propanol, 2-methoxy propanol, 3-methoxy butanol, cyclohexanone, cyclopentanone, propylene glycol methyl ether acetate, propylene glycol ethyl ether acetate, 3-methoxybutyl acetate, ethyl 3-ethoxypropionate, ethyl cellosolve acetate, methyl cellosolve acetate, butyl acetate, dipropylene glycol monomethyl ether, and a mixture thereof.

11. The photosensitive resin composition according to claim 2, wherein the photosensitive resin composition further includes one or more additives selected from the group consisting of a curing accelerator, a thermal polymerization inhibitor, a plasticizer, an adhesion promoter, a filler, and a surfactant.

12. The photosensitive resin composition according to claim 11, wherein the curing accelerator comprises one or more selected from the group consisting of 2-mercaptobenzoimidazole, 2-mercaptobenzothiazole, 2-mercaptobenzoxazole, 2,5-dimercapto-1,3,4-thiadiazole, 2-mercapto-4,6-dimethylaminopyridine, pentaerythritol tetrakis(3-mercaptopropionate), pentaerythritol tris(3-mercaptopropionate), pentaerythritol tetrakis(2-mercaptoacetate), pentaerythritol tris(2-mercaptoacetate), trimethylolpropane tris(2-mercaptoacetate), trimethylolpropane tris(3-mercaptopropionate), trimethylolethane tris(2-mercaptoacetate), and trimethylolethane tris(3-mercaptopropionate).

13. The photosensitive resin composition according to claim 11, wherein the thermal polymerization inhibitor comprises one or more selected from the group consisting of p-anisole, hydroquinone, pyrocatechol, t-butyl catechol, N-nitrosophenylhydroxyamine ammonium salt, N-nitrosophenylhydroxyamine aluminum salt, and phenothiazine.

14. The photosensitive resin composition according to claim 2, wherein a mercury vapor arc, a carbon arc, or a Xe arc, which emits light having a wavelength of 250 to 450 nm, is used as a light source for curing the photosensitive resin composition.

15. A method of manufacturing a transparent thin film for a liquid crystal display comprising:
    forming a film by using the photosensitive resin composition according to claim 2.

* * * * *